United States Patent
McCabe (10) Patent No.: US 8,689,943 B2
(45) Date of Patent: Apr. 8, 2014

(54) ENERGY STORAGE ON AN ELEVATED PLATFORM AND TRANSFER METHOD

(75) Inventor: Paul P. McCabe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 928 days.

(21) Appl. No.: 12/714,977

(22) Filed: Mar. 1, 2010

(65) Prior Publication Data

US 2011/0209949 A1    Sep. 1, 2011

(51) Int. Cl.
*B66F 9/075* (2006.01)

(52) U.S. Cl.
USPC ........................................... 187/222

(58) Field of Classification Search
USPC .......... 187/220, 222; 320/103, 104, 113, 115, 320/109
See application file for complete search history.

(56) References Cited

U.S. PATENT DOCUMENTS

| | | | |
|---|---|---|---|
| 4,252,217 A | 2/1981 | Benjamin | |
| 4,286,911 A | 9/1981 | Benjamin | |
| 5,071,184 A | 12/1991 | Dessaux | |
| 5,890,563 A | 4/1999 | Avitan et al. | |
| 6,182,797 B1 | 2/2001 | Tebbe et al. | |
| 6,222,282 B1 * | 4/2001 | Rossi et al. | 307/9.1 |
| 6,559,621 B2 * | 5/2003 | Corless et al. | 320/103 |
| 6,938,733 B2 * | 9/2005 | Eilinger | 187/290 |
| 7,730,981 B2 * | 6/2010 | McCabe et al. | 180/65.225 |
| 7,791,216 B2 * | 9/2010 | Xu et al. | 307/9.1 |
| 8,193,761 B1 * | 6/2012 | Singh | 320/104 |
| 8,203,310 B2 * | 6/2012 | McCabe | 320/132 |
| 2002/0171397 A1 * | 11/2002 | Adrian et al. | 320/119 |
| 2006/0097575 A1 * | 5/2006 | Xu et al. | 307/9.1 |
| 2007/0222686 A1 | 9/2007 | Carscallen, II et al. | |
| 2008/0100135 A1 * | 5/2008 | Lazarovich et al. | 307/9.1 |
| 2008/0128214 A1 * | 6/2008 | Tahashi et al. | 187/224 |
| 2008/0290842 A1 * | 11/2008 | Davis et al. | 320/166 |
| 2009/0155655 A1 | 6/2009 | Sabapathy et al. | |

FOREIGN PATENT DOCUMENTS

| | | |
|---|---|---|
| CN | 1830750 A | 9/2006 |
| DE | 102007004200 A1 | 7/2008 |
| EP | 2058918 A2 | 5/2009 |
| FR | 2911862 A1 | 8/2008 |
| JP | 200354898 A | 2/2003 |
| JP | 2003054898 A | 2/2003 |
| JP | 2008297121 A | 12/2008 |

* cited by examiner

*Primary Examiner* — William A Rivera
*Assistant Examiner* — Michael Riegelman
(74) *Attorney, Agent, or Firm* — Quarles & Brady LLP (57) ABSTRACT

A lift truck includes a secondary rechargeable energy storage device on a vertically movable platform that is separate from a primary rechargeable energy storage device on the lift truck's main tractor unit without the use of wires or hoses for transfer of power or controls between the main tractor unit and the platform. The quantity of energy stored in the secondary rechargeable energy storage device is sufficient to power platform electrical loads for a predetermined amount of time until the platform is lowered. When the platform is lowered, the secondary rechargeable energy storage device is recharged by the primary energy storage device.

15 Claims, 5 Drawing Sheets

ENERGY STORAGE ON AN ELEVATED PLATFORM AND TRANSFER METHOD

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The present invention relates to the field of industrial lift trucks, and more specifically to an energy storage and transfer system and method on a lift truck platform.

BACKGROUND OF THE INVENTION

Lift trucks are designed in a variety of configurations to perform a variety of tasks. Most tasks include the operation of a vertically movable platform to lift and lower a load, such as materials on a pallet. Power for the operation of the lift truck, including the tractor unit and the platform, typically comes from energy stored in one or more large capacity rechargeable batteries, a fuel cell, or an internal combustion engine, or a combination of these power sources. The power source is typically located on the tractor unit of the lift truck.

Common methods of providing necessary power and control from the tractor unit to the platform includes the use of long lengths of wires that extend from the tractor unit through or on a vertically extendable mast or elevating mechanism to the platform. The mast typically consists of rigid metal frames that are nested within each other like an extension ladder. As one or more of the mast's nested metal frames are extended upward, the platform is raised. Threading wires in or on the mast is a complex design and manufacturing process. There may be bearings between the moving frames and the wires, and the wires must be placed within the sliding metal frames without interfering with movement. Placing of wires on or in the moving metal frames will, by necessity, require more space for packaging.

It would therefore be desirable to reduce and/or eliminate the need to route wires from the tractor unit to the platform, and replace the use of wires routed on the vertically extendable mast with a secondary energy storage device on the platform.

SUMMARY OF THE INVENTION

The present invention overcomes the drawbacks of the previous lift truck systems and methods by reducing or eliminating the use of wires for providing power and control to the platform, and replacing the wires with a secondary energy storage device on the platform.

In one aspect of the invention, a lift truck having a primary energy storage device and a secondary energy storage device is provided. The lift truck comprises a tractor unit, with a vertically movable platform attached to the tractor unit. The tractor unit includes the primary energy storage device and is adapted for moving the lift truck and supporting the platform during up and down movements of the platform. The lift truck may also comprise a tractor unit and a vertically extendable mast mounted relative to the tractor unit. The mast includes a fixed base and an extendable mast section. The vertically movable platform may be attached to the extendable mast section.

In another aspect of the invention, systems and methods provide a lift truck including a tractor unit with a primary energy storage device disposed on the tractor unit. The primary energy storage device is adapted to provide operating power to the tractor unit, and may include a rechargeable device. A vertically movable platform is attached to the tractor unit and is vertically movable between an upper position and a lower position. A rechargeable secondary energy storage device is disposed on the platform, the rechargeable secondary energy storage device being rechargeable upon moving the platform toward the lower position. A vertically extendable mast may be mounted relative to the tractor unit with the mast including a fixed base and an extendable mast section. The platform may be attached to the extendable mast section, and is vertically movable with the extendable mast section between the upper position and the lower position.

In some embodiments, an energy transfer coupling is included. The energy transfer coupling is adapted to transfer energy from the primary energy storage device to the rechargeable secondary energy storage device to recharge the rechargeable secondary energy storage device. The energy transfer coupling may also be adapted to transfer energy from the secondary energy storage device to the primary energy storage device. The energy transfer coupling comprises at least one of a physical coupling and an inductive coupling.

In other embodiments, the rechargeable secondary energy storage device further includes at least one capacitor, where the at least one capacitor is adapted to accept an energy transfer from the primary energy storage device. The rechargeable secondary energy storage device may also include a DC-to-DC voltage converter. The voltage converter is adapted to convert a voltage from the at least one capacitor to a recharge voltage to recharge the rechargeable secondary energy storage device.

In yet other embodiments, the tractor unit includes a first wireless communication unit and the platform includes a second wireless communication unit. The first and second wireless communication units are adapted to provide a wireless communication link between the tractor unit and the platform.

In another aspect of the invention, systems and methods provide a lift truck including a tractor unit with a rechargeable primary energy storage device disposed on the tractor unit. A vertically movable platform is attached to the tractor unit, the platform being vertically movable between an upper position and a lower position. A rechargeable secondary energy storage device is disposed on the platform. The lift truck also includes an energy transfer coupling. The energy transfer coupling is adapted to transfer energy from the rechargeable primary energy storage device on the tractor unit to the rechargeable secondary energy storage device on the platform to recharge the rechargeable secondary energy storage device. A vertically extendable mast may be mounted relative to the tractor unit, with the mast including a fixed base and an extendable mast section. The platform may be attached to the extendable mast section, and may be vertically movable with the extendable mast section between the upper position and the lower position.

In some embodiments, the energy transfer coupling further includes at least one capacitor and a voltage converter. The at least one capacitor is adapted to accept an energy transfer from the rechargeable primary energy storage device, and the voltage converter is adapted to convert a voltage from the at least one capacitor to a recharge voltage to recharge the rechargeable secondary energy storage device.

In other embodiments, a transfer coupling sense circuit is included, the circuit adapted to sense a voltage potential difference between the primary energy storage device and the rechargeable secondary energy storage device.

In yet another aspect of the invention, a method provides a lift truck, the lift truck comprising a tractor unit and a primary energy storage device disposed on the tractor unit. A vertically movable platform is attached to the tractor unit, and a rechargeable secondary energy storage device disposed on the platform. The method includes lowering the platform from an upper position to a lower recharge position and recharging the rechargeable secondary energy storage device by transferring energy from the primary energy storage device to the rechargeable secondary energy storage device when the platform is in the lower recharge position. A vertically extendable mast may be mounted relative to the tractor unit, with the mast including a fixed base and an extendable mast section. The platform may be lowered with the extendable mast section from the upper position to the lower recharge position.

In some embodiments, the method further includes sensing for a voltage potential difference between the primary energy storage device and the rechargeable secondary energy storage device, and recharging only when the voltage potential difference is sensed.

In other embodiments, transferring energy from the primary energy storage device to the rechargeable secondary energy storage device occurs automatically when the platform in the lower recharge position.

In yet other embodiments, the potential energy generated from lowering the platform may be used for recharging the rechargeable secondary energy storage device. The tractor unit and the platform may also be operated using energy supplied by the rechargeable secondary energy storage device when the primary energy storage device is non-operational.

The foregoing and other objects and advantages of the invention will appear in the detailed description which follows. In the description, reference is made to the accompanying drawings which illustrate a preferred embodiment.

BRIEF DESCRIPTION OF THE DRAWINGS

FIG. 4 is a schematic view of an energy transfer coupling unit;

DETAILED DESCRIPTION OF THE PREFERRED EMBODIMENT

Figure 1:
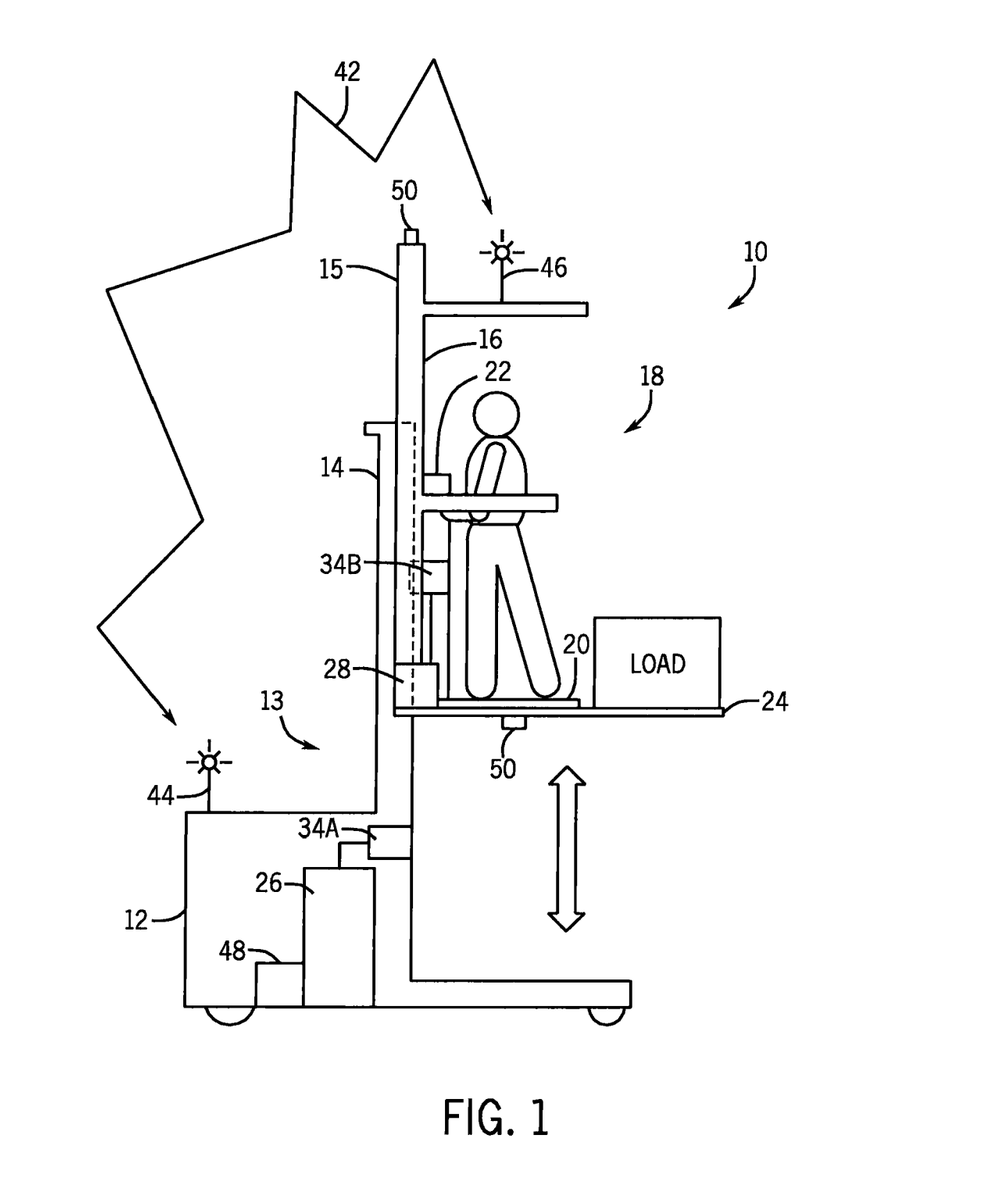
FIG. 1 is a side view of a lift truck employing a primary energy storage device, a secondary energy storage device, and an energy transfer coupling unit for transferring energy between the primary energy storage device and the secondary energy storage device.
Figure 2:
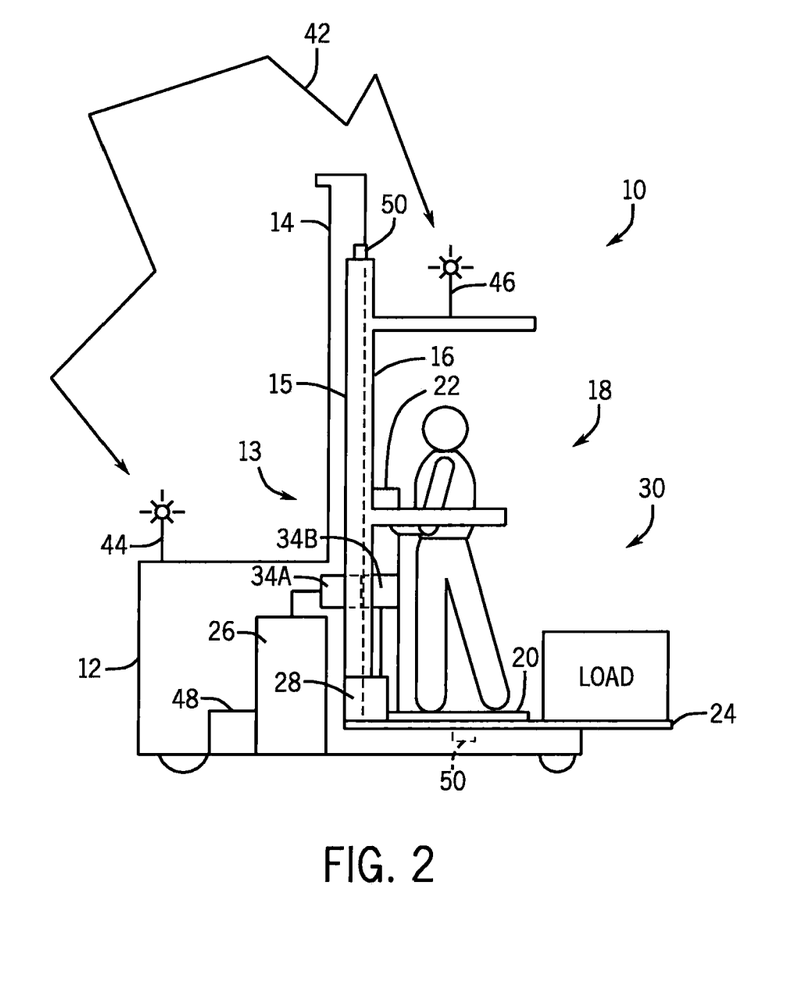
FIG. 2 is a side view of the lift truck of FIG. 1, showing a vertically movable platform in a recharge position adapted to allow recharging of the secondary energy storage device.
Figure 3:
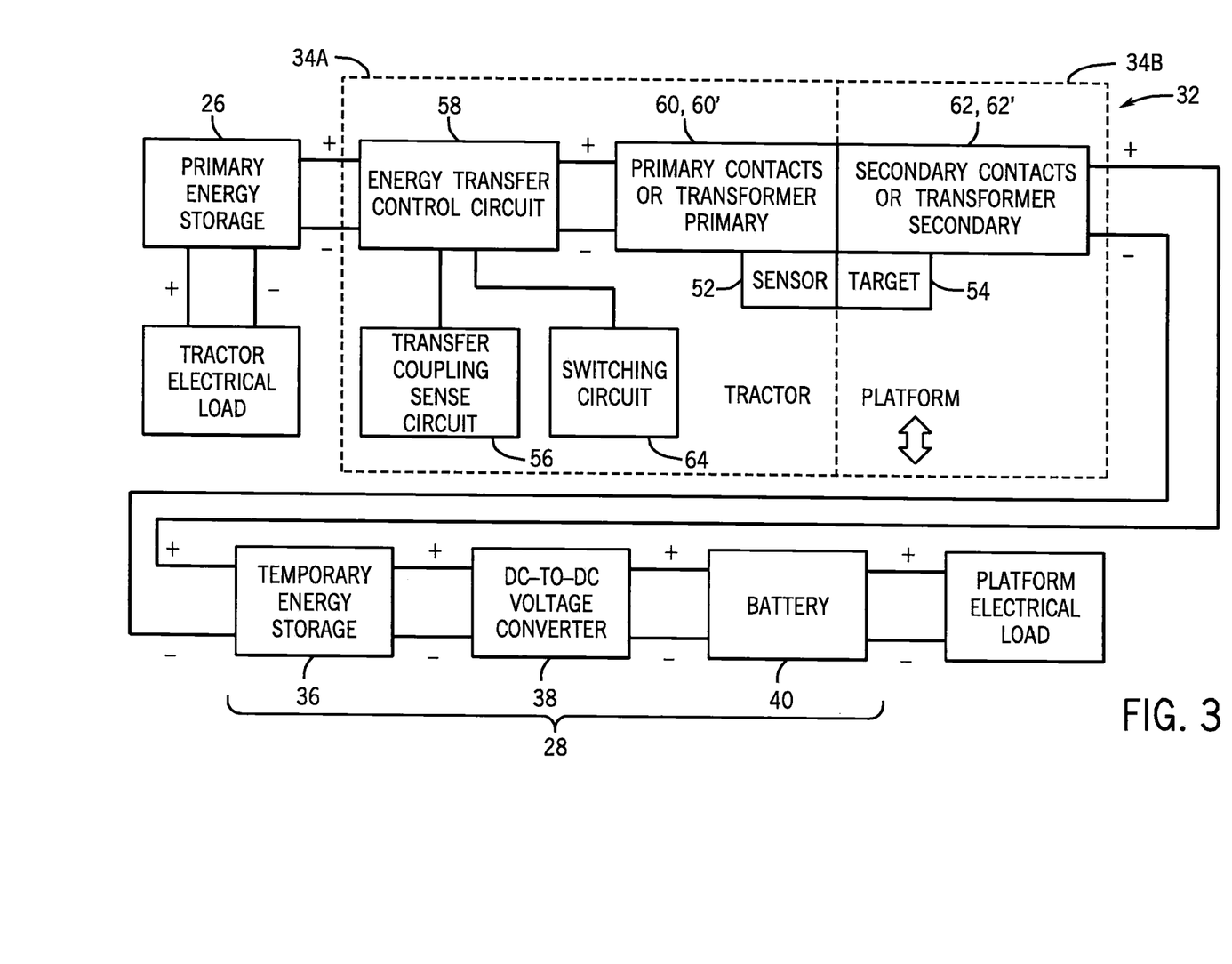
FIG. 3 is a schematic view of an electrical circuit incorporating a primary energy storage device, a secondary energy storage device, and an energy transfer coupling unit for transferring energy between the primary energy storage device and the secondary energy storage device.

Referring now to the Figures, and more particularly to FIGS. 1 through 3, the general arrangement of a representative electrical circuit and material handling vehicle or lift truck 10 in accordance with a preferred embodiment is shown. The lift truck 10 includes a tractor unit 12, and a vertically extendable mast 13 mounted relative to the tractor unit 12. The mast 13 includes a fixed base 14 and an extendable mast section 15, with a vertically movable platform 16 attached to the extendable mast section 15. The extendable mast section 15 raises and lowers the platform 16.

In one embodiment of the lift truck, the platform 16 includes an operator station or compartment 18. The operator compartment 18 includes an operator platform 20 on which the operator sits and/or stands, and an operator console 22 for operation of the lift truck 10, including operation of the platform functions. The console 22 includes controls (not shown) for controlling lift truck steering and speed, and includes controls for controlling raising and lowering the platform 16, and operation of the platform forks 24. The operator compartment 18 may also include lights, and one or more displays for displaying operational data. It is to be appreciated that alternative embodiments of the lift truck 10 may include a fixed operator compartment 18 on the tractor unit (i.e., the operator does not travel up and down with the platform), or may not include a designated operator compartment, such as when the operator does not stand on the lift truck 10, but walks along with the lift truck 10 and controls the lift truck using a control handle (not shown).

Still referring to FIGS. 1 through 3, the lift truck 10 includes a primary energy storage device 26 located in or on the tractor unit 12. Variations of the primary energy storage device may include, for example, one or more rechargeable batteries, a fuel cell assembly, or a combination of both. The primary energy storage device 26 is adapted to provide electrical power for the lift truck needs for a desired amount of time, e.g., one hour, several hours, one day, or several days, or more or less, depending on usage and application. After the primary energy storage device 26 is depleted to a predetermined amount, such as less than 50%, or 25%, or 10%, or more or less, of a full charge, the primary energy storage device 26 is recharged in a known manner, i.e., connection to an electrical outlet for recharging and/or replacement of fuel for a fuel cell.

The lift truck 10 also includes a secondary energy storage device 28 in or on the platform 16 (or in or on the extendable mast section 15), the secondary energy storage device 28 being a separate device from the primary energy storage device 26. Variations of the secondary energy storage device include, for example, one or more rechargeable batteries, a fuel cell assembly, or a combination of both. The secondary energy storage device 28 is sized and configured to provide power for the platform electrical load and systems, such as horizontal adjustment of the platform forks 24 and operation of the lights and displays, for example, without the need to draw power from the primary energy storage device 26. When the platform 16 is elevated, the secondary energy storage device 28 is the main source of power for the platform's electrical load.

In order to accommodate the typical uses of the lift truck 10, i.e., frequent up and down movement of the platform 16, a combination of a temporary energy storage 36 (e.g., capacitors, such as ultracapacitors), a DC-to DC voltage converter 38, and one or more batteries 40 can be provided as the secondary energy storage device 28 (see FIG. 3). The secondary energy storage device 28 first accepts a fast energy transfer from the primary energy storage device 26. The energy transferred in the fast energy transfer is stored temporarily in one or more of the capacitors 36, and then the stored energy is converted via the voltage converter 38 to a more constant voltage to recharge the battery(s) 40.

This transfer of energy is desirably relatively fast compared to the time required to recharge the primary energy storage device 26 in order to avoid degrading the overall usage and performance of the lift truck 10. The time to complete a transfer of power from the primary energy storage device 26 to the capacitors 36 of the secondary energy storage device 28 may be measured in seconds and minutes as compared to hours for a typical lift truck battery recharge. It is to be appreciated that the secondary energy storage device 28 may also be recharged in a known manner similar to or the same as recharging the primary energy storage device 26, i.e., connection to an electrical outlet for recharging and/or replacement of fuel for a fuel cell.

When the task or tasks utilizing the platform 16 are completed by the operator, the platform 16 is lowered for normal horizontal movement of the lift truck 10. When the vertical movement of the platform 16 has substantially stopped and the platform is in a lowered recharging position 30 (see FIG. 2), the primary energy storage device 26 is then used to recharge the secondary energy storage device 28. In the lowered recharging position 30, recharging takes place and the supply of energy is replenished in the secondary energy storage device 28. Thus, the use of the primary and secondary energy storage devices allows for the reduction or elimination of electric wires extending from the tractor unit 12, through and/or on the vertically extendable mast 13 and extendable mast section 15, and to the platform 16.

When energy is being transferred from the primary energy storage device 26 to the secondary energy storage device 28, the amount and intensity of the energy are desirably controlled. The primary energy storage device 26 may have a large amount of energy but not infinite, for example, typically 20 to 50 kwh, as a non-limiting example. Removing too large a quantity of energy from the primary energy storage device 26 when it is near depletion itself may not be desirable due to the possibility of draining the primary energy storage device 26 to a point where the lift truck is non-operational.

When the energy is being transferred, it may be transferred at a rate that is not able to be absorbed by the battery(s) 40 of the secondary energy storage device 28. One or more of the capacitors 36, e.g., ultracapacitor(s), provide a short-term storage medium, and are used to rapidly absorb and temporarily store the transferred energy. Components such as capacitors have the ability to accept large quantities of power quickly due to their low internal resistance. Another characteristic of a capacitor is that its voltage changes directly with the charge level. The energy contained within the capacitor is a function of its capacitance and the voltage as given by:

$$E = \frac{C * V^2}{2}$$

Where:
E=The stored energy in Joules (or watt-seconds);
C=The capacitance in Farads; and
V=The voltage across the terminals in volts.

When in the recharging position 30, assuming there is a difference in electrical potential between the primary and secondary energy storage devices detected by an energy transfer control circuit 58, energy will start being transferred. When the voltage on the ultracapacitor 36 is replenished, the DC-to-DC converter 38 converts the stored capacitor voltage to a more constant voltage, such as 12, 18, or 24 VDC, that is more acceptable for charging the battery 40 on the platform 16. As this transfer of energy takes place, the voltage at the ultracapacitor 36 will drop as shown in FIG. 4.

Figure 4:
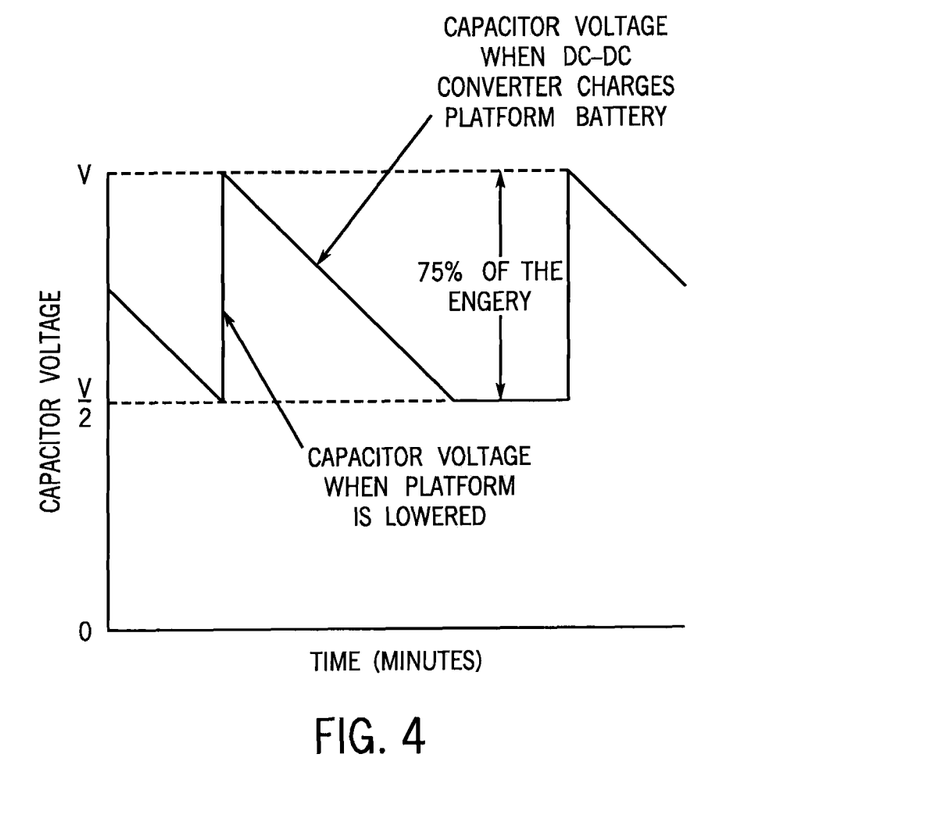
FIG. 4 is a graphical view of a charging pattern for the secondary energy storage device

Still referring to FIG. 4, the energy content in the top half of the ultracapacitor 36 voltage range contains about 75% of the total energy available for use. As the ultracapacitor 36 is repeatedly charged (when the platform 16 is in the recharging position), and discharged through the DC-to-DC converter 38, its stored energy is made available to charge the battery 40 and for use by the platform 16. The battery 40 may comprise Nickel Metal Hydride or Lithium-Ion for example, to reduce weight of the secondary energy storage device 28. These newer technology batteries should be charged under a more controlled environment to prevent damaging voltages and undesirable temperature rise.

At a predetermined level, e.g., V/2, the voltage at the ultracapacitor 36 may become too low for the DC-to-DC converter 38 to use, so the converter 38 ceases its operation of charging the battery 40. The systems of the platform 16 will continue to draw power from the battery 40 that has been recently recharged.

The ultracapacitor 36 is being used in a manner that takes advantages of its quick charge/discharge characteristics. The DC-to-DC converter 38 can efficiently, e.g., >90%, convert the capacitor voltage to charge the battery 40. In this configuration, the battery 40 is periodically being charged from the DC-to-DC converter 38 in a manner best suited for extending the life of the battery 40. The electric and electronic systems of the platform 16 see a relatively smooth bus voltage in which to operate.

Referring to FIG. 3, with the platform 16 lowered to the recharging position 30, an energy transfer coupling unit 32 is adapted to allow power to be transferred between the primary and secondary energy storage devices. The energy transfer coupling unit 32 comprising a primary side coupling 34A mounted on the tractor 12 and a secondary side coupling 34B mounted on the platform 16 (or extendable mast section 15). Before power can flow, a primary side sensor 52 on the tractor unit 12 is aligned with a corresponding secondary side target 54 on the platform 16. Unless the sensor 52 and the target 54 are aligned, no current will flow. When the sensor 52 and the target 54 are aligned, a transfer coupling sense circuit 56 is adapted to indicate an aligned condition to the energy transfer control circuit 58. The energy transfer control circuit 58 is adapted to allow the stored energy available from the primary energy storage device 26 to pass to the secondary energy storage device 28 if the transfer coupling sense circuit 56 indicates that the sensor 52 and target 54 are aligned and that there is a voltage potential difference between the primary and secondary energy storage devices. In addition, the components involved in the energy transfer may have limits to their current carrying capability so the intensity of the transfer may be controlled by the energy transfer control circuit 58. In one embodiment, a pulse width modulation (PWM) switching circuit 64 may be used to keep the current levels within an acceptable range.

Figure 5:
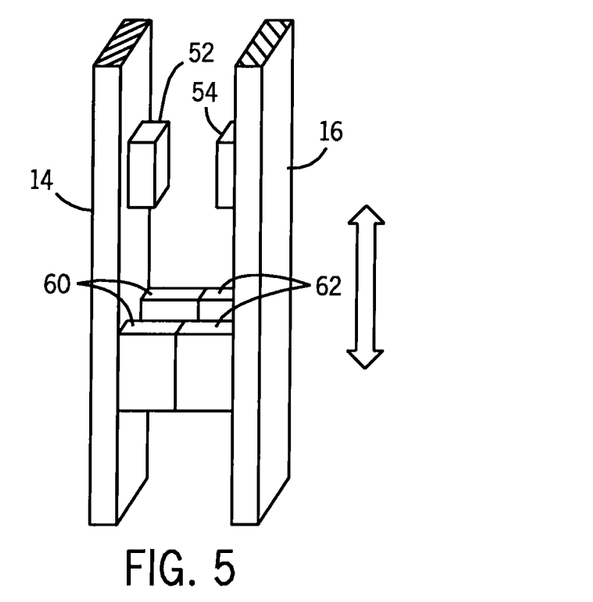
FIG. 5 is a perspective view of electrically primary and secondary contacts.

In order to allow the power available from the primary energy storage device 26 to pass to the secondary energy storage device 28, the primary side coupling 34A includes primary electrical contacts 60, and the secondary side coupling 34B includes secondary electrical contacts 62 (see FIG. 5). The primary and secondary electrical contacts 60, 62 will physically touch each other when the platform 16 is lowered to the recharging position 30, (i.e., when the sensor 52 and the target 54 align), to transfer the power from the primary energy storage device 26 to the secondary energy storage device 28. The primary contacts 60 are fixedly or movably positioned on the tractor unit 12, and the secondary contacts 62 are fixedly or movably positioned on the platform 16 or extendable mast section 15. When the contacts 60, 62 are in the correct position, and the energy transfer control circuit 58 detects a difference in voltage between the primary and secondary energy storage devices 26, 28, the power transfer may begin.

Figure 6:
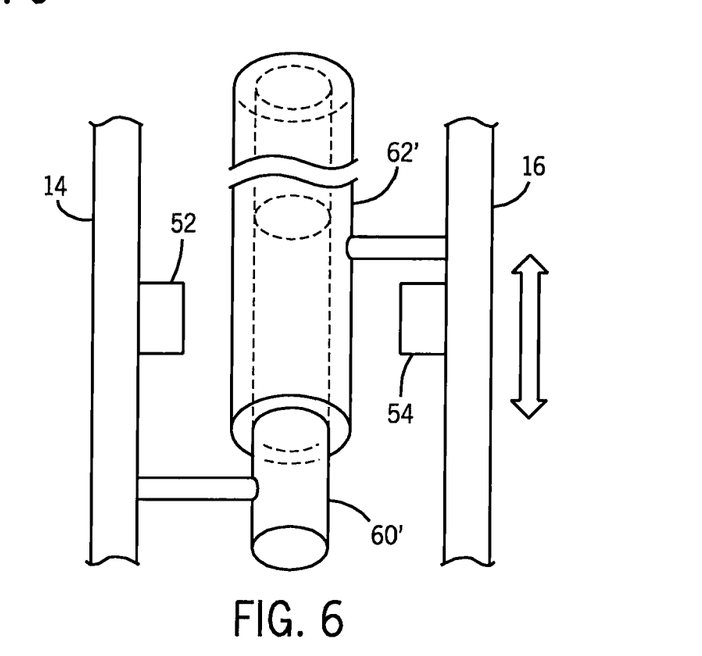
FIG. 6 is a perspective view of inductively coupled primary and secondary transformer windings.

In an alternative embodiment, the primary side coupling 34A includes a primary transformer winding 60', and the secondary side coupling includes a secondary transformer winding 62'. The primary transformer winding 60' and secondary transformer winding 62' are in inductive communication when the platform 16 is lowered to the recharging position 30, and will allow for inductive power transfer. In this alternative embodiment, the primary transformer winding 60' replaces the primary contacts 60, and the secondary transformer winding 62' replaces the secondary contacts 62. The primary energy storage device voltage may be inverted to a higher AC voltage that is then transformer coupled across a non-contact coupling. This configuration may be advantageous because of the non-contact energy transfer. It may be more maintenance-free and provide no exposed contact surfaces.

Preferably, the transformer windings 60' and 62' are adapted to fit inside one-another with only a thin layer of plastic insulator to separate them (see FIG. 6). However, fitting one winding inside another is not required to practice the invention. Advantageously, by using a high frequency signal, e.g., 40-50 KHz, as a non-limiting example, created in the energy transfer control circuit 58, the size of the transformer components may be relatively small.

Similar to the primary and secondary contacts 60, 62, the primary transformer winding 60' inductively couple to the secondary transformer winding 62' when the platform 16 is lowered to the charging position 30. When the windings 60', 62' are in the correct position, and the energy transfer control circuit 58 detects a difference in voltage between the primary and secondary energy storage devices 26, 28, the power transfer may begin.

With the elimination of wires extending from the tractor unit 12 to the platform 16, wireless signals 42, such as control signals and/or operational signals, may be transmitted wirelessly between the platform 16 and the tractor unit 12. As seen in FIGS. 1 and 2, the tractor unit includes a first wireless communications device 44 and the platform includes a second wireless communications device 46. The power for the communications device 44 on the tractor 12 comes from the primary energy storage device 26, and the power for the communications device 46 on the platform 16 comes from the secondary energy storage device 28. The wireless signals 42 may be transmitted wirelessly between the tractor unit 12 and the platform 16 using a variety of known signals and frequencies, including WiFi, 900 MHz, ZigBee, etc., as non limiting examples.

The wireless communication system may be adapted to perform several functions; for example, a constant signal may be sent and acknowledged (similar to a watchdog timer) that lets the fork lift's main controller 48 know that the platform 16 is in constant communication. Should that signal fail to be received, a vehicle shutdown may be initiated as a failsafe methodology. Commands generated by the operator on the platform 16 or signals created from sensors 50 on the platform, for example, may be relayed to the fork lift's main controller 48. Feedback information useful to the operator, such as remaining battery or fuel capacity, fault codes, and general vehicle status may be sent to the tractor unit communications device 44 and the platform communication device 46 for display at the operator station.

In an alternative embodiment, the secondary energy storage device 28 located on the platform 16 can also be replenished by regenerative lowering if the vehicle is equipped with a suitable generator. Regenerative lowering uses the potential energy of an elevated platform 16 and converts that to electric power when the platform is lowered. Channeling the generated energy directly to the secondary energy storage device 28 located on the platform 16 may be more efficient as it eliminates the losses of charging the primary energy storage device 26 first before transferring the generated power to the platform 16, as previously described.

An additional use for the secondary energy storage device 28 on the platform 16 is as a backup power supply when the primary energy storage device 26 has been exhausted or otherwise not available. By having a reserve of energy on the platform 16, the flow of energy can be reversed back to the primary energy storage device 26 to keep vital systems energized, and may provide a sufficient amount of motive power to maneuver the lift truck 10 to a maintenance area for recharging. The additional power source on the platform 16 may increase the total amount of stored energy on the lift truck 10. This supplemental energy may, in effect, extend the operational time of the lift truck before the primary energy supply must be replenished.

It is to be appreciated that the use of the terms primary and secondary is not intended to be limiting or indicate any order. Descriptions such as first and second, or A and B may also be used and would remain consistent with the present disclosure.

A preferred embodiment of the invention has been described in considerable detail. Many modifications and variations to the preferred embodiment described will be apparent to a person of ordinary skill in the art. Therefore, the invention should not be limited to the embodiment described.

I claim:

1. A lift truck comprising:
a tractor unit;
a primary energy storage device disposed on the tractor unit, the primary energy storage device adapted to provide operating power to the tractor unit;
a vertically movable platform mounted relative to the tractor unit, the platform being vertically movable between an upper position and a lower position;
a rechargeable secondary energy storage device disposed on the platform, the rechargeable secondary energy storage device being rechargeable upon moving the platform toward the lower position;
an energy transfer control circuit adapted to sense a voltage potential difference between the primary energy storage device and the rechargeable secondary energy storage device;
a primary side sensor circuit and a secondary side target, such that when the primary side sensor circuit and secondary side target are aligned, a transfer coupling sense circuit indicates an aligned condition to the energy transfer control circuit; and
the rechargeable secondary energy storage device including at least one capacitor, the at least one capacitor adapted to accept an energy transfer from the primary energy storage device and temporarily store the energy transfer, the rechargeable secondary energy storage device further including a DC-to-DC voltage converter, the voltage converter adapted to convert a voltage from the at least one capacitor to a recharge voltage to recharge the rechargeable secondary energy storage device,
wherein the at least one capacitor is electrically connected between the primary energy storage device and the DCto-DC voltage converter when the primary side sensor circuit and the secondary side target are aligned such that the DC-to-DC voltage converter does not directly connect to the primary energy storage device.

2. The lift truck according to claim 1:
further including an energy transfer coupling, the energy transfer coupling adapted to transfer energy from the primary energy storage device to the rechargeable secondary energy storage device to recharge the rechargeable secondary energy storage device.

3. The lift truck according to claim 2:
wherein the primary energy storage device comprises a rechargeable device.

4. The lift truck according to claim 3:
wherein the energy transfer coupling is adapted to transfer energy from the secondary energy storage device to the primary energy storage device.

5. The lift truck according to claim 3:
wherein the energy transfer coupling is adapted to transfer energy from the secondary energy storage device to the primary energy storage device so as to recharge the primary storage device.

6. The lift truck according to claim 2:
wherein the energy transfer coupling comprises at least one of a physical coupling and an inductive coupling.

7. The lift truck according to claim 1:
further including a operator station, the operator station including controls adapted for use by the operator to control the tractor unit and the platform.

8. The lift truck according to claim 1:
wherein the tractor unit includes a first wireless communication unit and the platform includes a second wireless communication unit, the first and second wireless communication units adapted to provide a wireless communication link between the tractor unit and the platform.

9. The lift truck according to claim 8:
further including an operator station, the operator station including controls adapted for use by the operator to control the tractor unit and the platform via the first and second wireless communications units.

10. The lift truck according to claim 1:
further including a vertically extendable mast mounted relative to the tractor unit, the mast including a fixed base and an extendable mast section; and
the platform attached to the extendable mast section, the platform being vertically movable with the extendable mast section between the upper position and the lower position.

11. The lift truck according to claim 1:
wherein the voltage converter stops charging the rechargeable secondary energy storage device when the voltage from the at least one capacitor reaches a predetermined level.

12. The lift truck according to claim 1:
wherein the rechargeable secondary energy storage device includes at least one capacitor and at least one battery, the at least one capacitor adapted to accept an energy transfer from the primary energy storage device and temporarily store the energy transfer, the rechargeable secondary energy storage device further including a DC-to-DC voltage converter, the voltage converter adapted to convert a voltage from the at least one capacitor to a recharge voltage to recharge the at least one battery.

13. A lift truck comprising:
a tractor unit;
a rechargeable primary energy storage device disposed on the tractor unit,
a vertically movable platform mounted relative to the tractor unit, the platform being vertically movable between an upper position and a lower position;
a rechargeable secondary energy storage device disposed on the platform;
an energy transfer control circuit adapted to sense a voltage potential difference between the primary energy storage device and the rechargeable secondary energy storage device;
a primary side sensor circuit and a secondary side target, such that when the primary side sensor circuit and secondary side target are aligned, a transfer coupling sense circuit indicates an aligned condition to the energy transfer control circuit;
an energy transfer coupling, the energy transfer coupling adapted to transfer energy from the rechargeable primary energy storage device on the tractor unit to the rechargeable secondary energy storage device on the platform to recharge the rechargeable secondary energy storage device, the energy transfer coupling including at least one capacitor and a voltage converter; and
wherein the at least one capacitor is electrically connected between the primary energy storage device and the voltage converter when the primary side sensor circuit and the secondary side target are aligned such that the voltage converter does not directly connect to the primary energy storage device.

14. The lift truck according to claim 13:
further including a vertically extendable mast mounted relative to the tractor unit, the mast including a fixed base and an extendable mast section; and
the platform attached to the extendable mast section, the platform being vertically movable with the extendable mast section between the upper position and the lower position.

15. The lift truck according to claim 13:
wherein the energy transfer coupling is adapted to transfer energy from the rechargeable primary energy storage device on the tractor unit to the rechargeable secondary energy storage device on the platform to recharge the rechargeable secondary energy storage device when the voltage potential is sensed.

* * * * *